United States Patent
Berthold

(10) Patent No.: US 9,651,072 B2
(45) Date of Patent: May 16, 2017

(54) CLIP SECURING DEVICE, IN PARTICULAR FOR MOTOR VEHICLES

(71) Applicant: Bayerische Motoren Werke Aktiengesellschaft, Munich (DE)

(72) Inventor: Christian Berthold, Baierbach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/016,641

(22) Filed: Feb. 5, 2016

(65) Prior Publication Data
US 2016/0153483 A1 Jun. 2, 2016

Related U.S. Application Data

(63) Continuation of application No. PCT/EP2014/067026, filed on Aug. 7, 2014.

(30) Foreign Application Priority Data

Aug. 9, 2013 (DE) .................... 10 2013 215 823

(51) Int. Cl.
| | |
|---|---|
| B60R 19/24 | (2006.01) |
| F16B 5/06 | (2006.01) |
| F16B 21/08 | (2006.01) |
| B62D 27/06 | (2006.01) |

(52) U.S. Cl.
CPC ............ *F16B 5/0614* (2013.01); *B62D 27/06* (2013.01); *F16B 21/088* (2013.01)

(58) Field of Classification Search
CPC ........ F16B 5/06; F16B 5/0614; F16B 5/0664; F16B 5/0642; B60R 19/24; B60R 19/18; B60R 19/04; Y10T 24/309; Y10T 403/60; Y10T 403/606
See application file for complete search history.

(56) References Cited

U.S. PATENT DOCUMENTS

| | | | |
|---|---|---|---|
| 4,593,441 A * | 6/1986 | St. Louis | F16B 5/0614 24/295 |
| 5,045,976 A | 9/1991 | Guilleminot | |
| 5,233,506 A | 8/1993 | Semenik et al. | |
| 5,622,444 A | 4/1997 | Groennevik | |
| 6,135,517 A * | 10/2000 | Cordebar | B60R 19/24 293/128 |

(Continued)

FOREIGN PATENT DOCUMENTS

| | | |
|---|---|---|
| AT | 381 993 B | 12/1986 |
| DE | 73 36 910 | 1/1974 |

(Continued)

OTHER PUBLICATIONS

Machine Translation of JP2001-173615, http://worldwise.espacenet.com, generated Jun. 16, 2016.*

(Continued)

*Primary Examiner* — Daniel Wiley
(74) *Attorney, Agent, or Firm* — Crowell & Moring LLP

(57) ABSTRACT

A clip securing device has a receiving part provided with an opening. A bridge portion of an insert part can be inserted into the opening, said bridge portion having a detent with a slanted surface which deflects the bridge portion when the bridge portion is inserted into the opening such that said bridge portion is elastically expanded.

20 Claims, 2 Drawing Sheets

(56) References Cited

U.S. PATENT DOCUMENTS

| | | | | |
|---|---|---|---|---|
| 6,729,793 | B2* | 5/2004 | Cordebar | B60R 19/24 293/155 |
| 7,017,436 | B2* | 3/2006 | Winchell | F16J 3/042 180/90.6 |
| 8,451,603 | B2* | 5/2013 | Leggett | B23P 11/02 312/223.1 |
| 8,480,186 | B2* | 7/2013 | Wang | H05K 5/0013 312/223.1 |
| 2008/0317549 | A1* | 12/2008 | Matthews | B60R 19/52 403/376 |
| 2012/0146349 | A1* | 6/2012 | Holderle | B60R 19/24 293/155 |

FOREIGN PATENT DOCUMENTS

| | | |
|---|---|---|
| DE | 295 10 304 U1 | 9/1995 |
| DE | 198 35 652 A1 | 2/2000 |
| EP | 0 319 793 A1 | 6/1989 |
| EP | 0 350 977 A1 | 1/1990 |
| EP | 0 685 403 A1 | 12/1995 |
| JP | 2001173615 A * | 6/2001 |

OTHER PUBLICATIONS

International Search Report (PCT/ISA/210) issued in PCT Application No. PCT/EP2014/067026 dated Dec. 8, 2014 with English translation (Six (6) pages).

German-language Written Opinion (PCT/ISA/237) issued in PCT Application No. PCT/EP2014/067026 dated Dec. 8, 2014 (Five (5) pages).

German-language Search Report issued in counterpart German Application No. 10 2013 215 823.8 dated Jun. 11, 2014 with partial English translation (Twelve (12) pages).

* cited by examiner

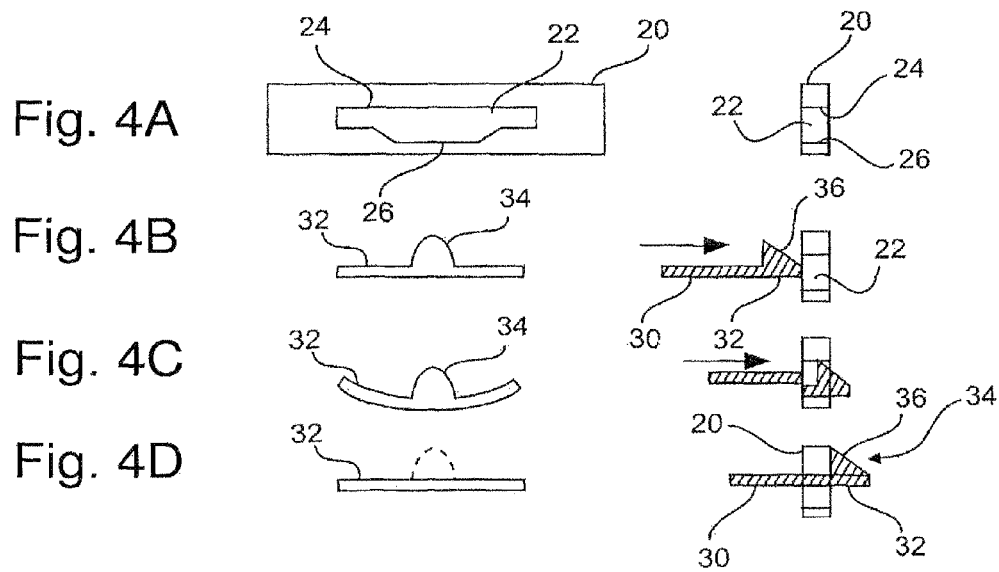
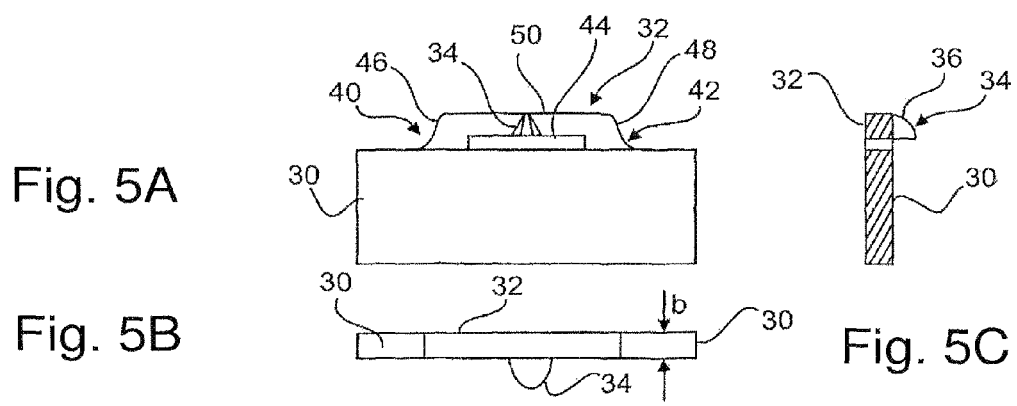
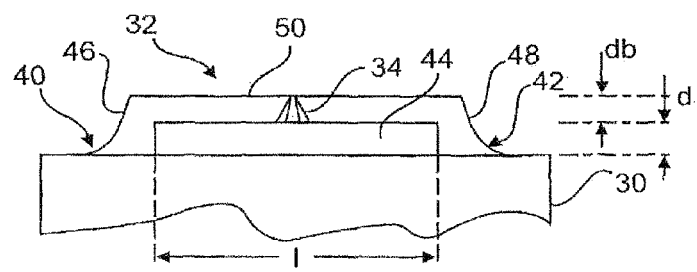
Fig. 4A
Fig. 4B
Fig. 4C
Fig. 4D
Fig. 5A
Fig. 5B
Fig. 5C
Fig. 6

CLIP SECURING DEVICE, IN PARTICULAR FOR MOTOR VEHICLES

CROSS REFERENCE TO RELATED APPLICATIONS

This application is a continuation of PCT International Application No. PCT/EP2014/067026, filed Aug. 7, 2014, which claims priority under 35 U.S.C. §119 from German Patent Application No. 10 2013 215 823.8, filed Aug. 9, 2013, the entire disclosures of which are herein expressly incorporated by reference.

BACKGROUND AND SUMMARY OF THE INVENTION

Known clip securing devices have torsion clips which have a relatively long and wide design and low restoring forces, or bending clips which are relatively long and also have low restoring forces.

It is an object of the invention to provide a further clip securing device.

This and other objects are achieved by way of a clip securing device according to the invention having a receiving part with an opening and an insert part with a supporting part and a bridge portion. The bridge portion protrudes with respect to the supporting part and can be inserted into the opening, the direction of the protruding being the inserting direction.

The opening has an upper edge and a lower edge, and the bridge portion has two legs and a center section connecting the latter, along which center section a slot is present between the center section and the supporting part. On its top side, the bridge portion has a detent with a slanted surface which, when the center section of the bridge portion is inserted, is deflected into the opening of the bridge portion in the direction toward the lower edge of the opening.

In the process, the bridge portion, more precisely, its center section between the two legs, when the detent is inserted with its slanted surface downward, is deflected in the direction of the lower edge of the opening and, on the whole, is therefore elastically expanded.

As soon as the slanted surface has passed through the opening, the center section of the bridge portion will therefore snap back (upwards) so that the detent engages. In this case, the catching takes place between the front side (in the inserting direction) of the supporting part, which rests against the receiving part, and the rearward (with respect to the inserting direction) surface of the detent.

In an embodiment of the clip securing device, the cross-section of the detent has a rounded design. As a result, it can be prevented that material damage occurs by splintering or by a cutting destruction when the detent is inserted.

The inserting part can basically consist of any suitable material that permits the required elastic expansion of the center section of the bridge portion.

In an embodiment of the invention, the supporting part, the bridge portion and the detent are constructed in one piece of a plastic material.

This permits a simple and cost-effective manufacturing from a plastic material by means of injection molding, which correspondingly also applies to the material of the receiving part having the opening.

When the manufacturing takes place by means of injection molding, the slot is formed by a web present in the injection mold. The injected plastic flows on both sides around the web for forming the legs of the bridge portion and is then combined in the location where the detent is formed. This results in a weld line of the two flowing-together plastic flows. In principle, a weld line represents a weakening of the material which, however, in the present case, is compensated by a greater thickness of the material of the detent (its height).

According to a further embodiment of the invention, in the case of such a clip securing device made of plastic material, the transitions between the legs of the bridge portion and the supporting part have a rounded design. This prevents the occurrence of notch stress, which could take place in the case of a sharp-edged transition between the legs and the supporting part.

In a further embodiment of the invention, the plastic material is a thermoplastic, such as PP, ABS, PC, PA or a thermoplastic elastomer, such as PP/EPDM.

In a further embodiment of the invention, the slanted surface extends up to a height of from 1 to 2 mm above the top side of the bridge portion. By way of a sliding of the bridge portion into the opening, a sufficient expansion of the center section can thereby be achieved.

A further embodiment of the invention relates to a motor vehicle having a clip securing device according to an embodiment of the invention. In the case of a motor vehicle, a clip securing device can be used, for example, for mounting a molding, a panel, coverings or trims, lids or housing halves.

In a further embodiment of the invention, the receiving part of the clip securing devices is provided on a structural part of the motor vehicle, and its insert part is provided on an assembly part of the motor vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 4A to 4D are schematic representations for outlining the process of inserting a bridge portion with a detent into an opening of a receiving part;

FIGS. 5A, 5B, 5C are a top view, a frontal view, and a sectional view, respectively, of an insert part according to an embodiment of the invention; and FIG. 6 is an enlarged representation of a top view of a part of the supporting part and of a bridge portion protruding with respect to the latter, according to an embodiment of the invention.

DETAILED DESCRIPTION OF THE DRAWINGS

Figure 1:
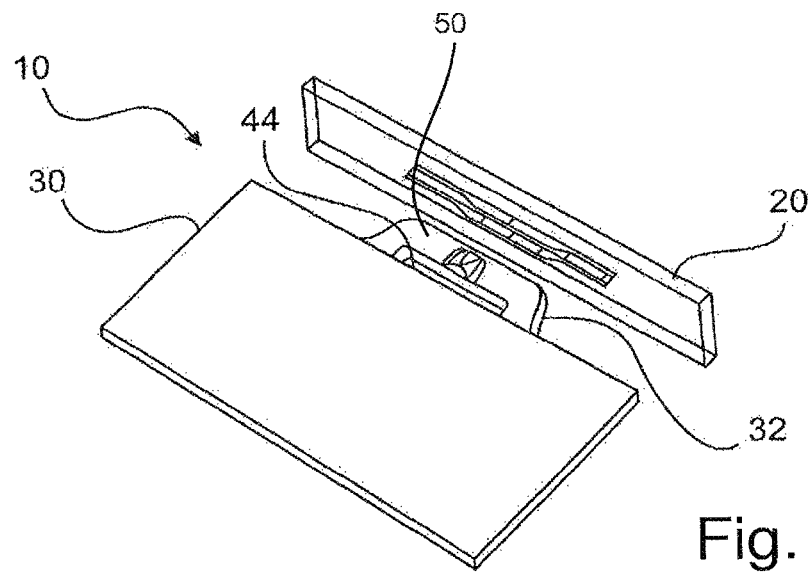
FIG. 1 is a perspective view of a clip securing device according to an embodiment of the invention.

In FIG. 1, a clip securing device 10 has two mutually separated parts, specifically a receiving part 20 and an insert part 30. The insert part 30 has a supporting part 31 and a bridge portion 32 protruding with respect to the latter. A slot 44 is provided between the center section 50 of the bridge portion 32 and the supporting part 31.

Figure 2:
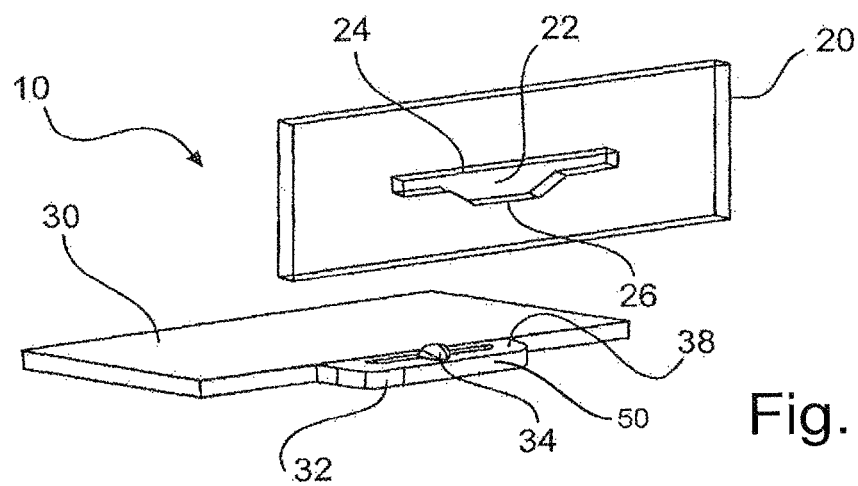
FIG. 2 is another perspective view of a clip securing device according to an embodiment of the invention

This is illustrated in further detail in FIG. 2, which outlines that a detent 34 is provided on the top side 38 of the bridge portion 32, and an opening 22 corresponding with the bridge portion 32 is formed in the receiving part 10, which opening 22 has a straight upper edge 24 as well as a lower edge 26.

In this case, the lower edge 26 of the opening 22 is designed such that, in its center section, it leaves sufficient space for a deflection of the center section 50 of the bridge portion 32 when the bridge portion is inserted into the opening 22.

Figure 3:
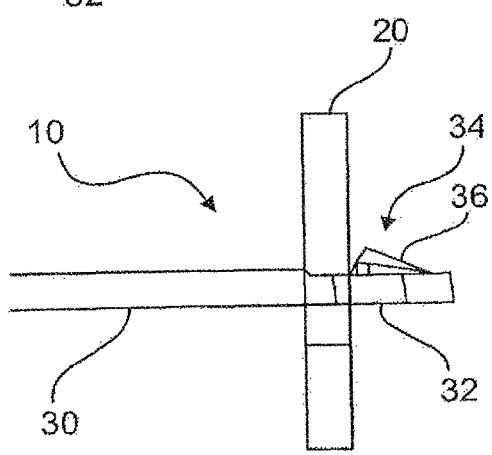
FIG. 3 is a corresponding sectional view of a bridge portion inserted into an opening of a receiving part and of an engaged detent.

FIG. 3 shows the mounted state of the clip securing device, wherein the front section of the bridge portion 32 has crossed through the opening 22 of the receiving part 20 and, on the other side of the opening 22, the supporting part 31 of the insert part strikes against the receiving part 20.

In a very simplified representation, FIG. 4 outlines the process of inserting the bridge portion 32 with the detent 34 provided thereon into the opening 22 of the receiving part 20 and through the latter. A top view of the receiving part 20 and of the bridge portion 32 respectively is in each case located on the left in FIG. 4, and a sectional view of the receiving part 20, possibly together with the bridge portion 32, is in each case, situated on the right in Figure in FIG. 4.

FIG. 4A illustrates the initial state, in which the receiving part 20 and the bridge portion 32 are separate.

The inserting of the bridge portion 32 into the opening 22 begins in FIG. 4B.

Following the state illustrated in FIG. 4B, the supporting part 31 and the bridge portion 32 with the slanted surface 36 of the detent move farther into the opening 22, so that, as illustrated in FIG. 4C, when the slanted surface 36 has been completely inserted into the opening 22, the bridge portion, more precisely, its center section 50, is pressed downward (in the direction of the lower edge 26 of the opening), whereby the bridge portion 32 is expanded.

In the final state illustrated in FIG. 4, in which the mounting has been completed, the detent 34 has snapped upward here, because the previous expansion of the bridge portion 32 has ceased to exist. On the right-hand side, on the right in FIG. 4D, a catching therefore takes place, specifically between the rearward surface of the detent 34 and the front side of the supporting part 31, on the other side, which strikes against the receiving part 20.

In this case, as illustrated in FIG. 3, the detent may have a rearward slanted surface (without a reference number), which has an angle of approximately 110° or more with respect to the surface of the bridge portion 32 (in FIG. 4, this angle amounts to 90°). In the embodiment illustrated in FIG. 3, the insert part 30, 31, 32 and the receiving part 20 can therefore be separated from one another without the use of a tool, which is not the case in the embodiment illustrated in FIG. 4.

FIGS. 5A to 5C illustrate the insert part 30, 31, 32, in the case of which the protruding bridge portion 32 has a center section 50 as well as two legs 46, 48, so that a slot 44 is formed between the center section 50 and the supporting part 31.

This slot 44 permits a gradual elastic expansion of the center section 50 during the inserting of the detent 34 into the opening 22 of the receiving part 20.

The respective transition 40 and 42 between the one leg 46 and the other leg 48 respectively of the bridge portion 32 has a rounded design for avoiding the occurrence of notch stress.

Several typical dimensions are indicated in FIGS. 5B and 6. In the case of an example made of plastic for a clip securing device of the invention, PP/EPDM-TV30 was used as the material, thus a relatively soft material, specifically for the receiving part as well as for the insert part constructed as one piece.

The material thickness "b" of the supporting part 31 (FIG. 5B) amounted to 2 mm, but may also amount to approximately 3 mm. The depth "d" (FIG. 6) of the slot 44, correspondingly the material thickness of the receiving part 20, amounts to at least 2 mm. The length "l" (FIG. 6) of the slot 44 amounted to 20 mm, and may typically be between 15 and 25 mm. The greater the value of l, the higher the detent 34 may be.

The bridge portion 32 illustrated in FIG. 6 has a total length (in the direction of "l") of approximately 35 mm.

As should be clear from the preceding description, the bridge portion 32 of the supporting part 31 juts forward with respect to the receiving part 20 by the extent marked "db" in FIG. 6. The extent db may have such a low value of from 7 to 8 mm that the extent of the jutting-out is extremely small in the case of the clip securing device according to the invention. This has special advantages for the mounting of parts in a narrow space, for example, in motor vehicles.

In the case of the above-described embodiment with the indicated measurements, in which the receiving part 20 as well as the insert part 30, 31, 32 consisted of PP+EPDM-TV30, thus of a relatively soft material, a short deflection with a high restoring force could be achieved even in the case of this soft material. In the case of a catch operation, this results in a very audible sound and therefore in a desirable acknowledgment of a successful mounting operation.

With respect to the selection of material for the elements of the invention, it should naturally be taken into account whether, for example, in the case of a motor vehicle, interior components or exterior components are involved, and whether characteristics, such as paintability and/or crash behavior are important.

LIST OF REFERENCE NUMBERS

10 Clip securing device
20 Receiving part
22 Opening
24 Upper edge (of 22)
26 Lower edge (of 22)
30 Insert part
31 Supporting part
32 Bridge portion
34 Detent
36 Slanted surface
38 Top side (of 32)
40 Transition
42 Transition
44 Slot
46 Leg (of 32)
48 Leg (of 32)
50 Center section (of 32)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clip securing device, comprising:
a receiving part having an opening; and
an insert part which has a supporting part and a bridge portion, the bridge portion protruding with respect to the supporting part and being insertable into the opening, wherein
the opening has an upper edge and a lower edge;
the bridge portion has two legs and a center section connecting the two legs, along which center section a slot is present between the center section and the supporting part, and
the bridge portion has a detent that is located in a region of a forwardmost end of the center section, the detent having a slanted surface on its top side, which slanted surface, during the insertion of the bridge portion into the opening, deflects the region of the forwardmost end of the center section of the bridge portion in a direction of the lower edge of the opening.

2. The clip securing device according to claim 1, wherein the detent has a rounded cross-section.

3. The clip securing device according to claim 2, wherein the supporting part, the bridge portion and the detent are constructed in one piece of plastic material.

4. The clip securing device according to claim 3, wherein transitions between the two legs and the supporting part have a rounded design.

5. The clip securing device according to claim 4, wherein the plastic material is a thermoplast or a thermoplastic elastomer.

6. The clip securing device according to claim 5, wherein the thermoplast is one of PP, ABS, PC or PA.

7. The clip securing device according to claim 5, wherein the thermoplastic elastomer is PP/EPDM.

8. The clip securing device according to claim 5, wherein the slanted surface extends up to a height of 1 to 2 mm above the top side of the bridge portion.

9. The clip securing device according to claim 3, wherein the plastic material is a thermoplast or a thermoplastic elastomer.

10. The clip securing device according to claim 9, wherein the thermoplast is one of PP, ABS, PC or PA.

11. The clip securing device according to claim 9, wherein the thermoplastic elastomer is PP/EPDM.

12. The clip securing device according to claim 1, wherein the supporting part, the bridge portion and the detent are constructed in one piece of plastic material.

13. The clip securing device according to claim 12, wherein transitions between the two legs and the supporting part have a rounded design.

14. The clip securing device according to claim 1, wherein the slanted surface extends up to a height of 1 to 2 mm above the top side of the bridge portion.

15. A motor vehicle, comprising:
a clip securing device, wherein the clip securing device comprises:
a receiving part having an opening; and
an insert part which has a supporting part and a bridge portion, the bridge portion protruding with respect to the supporting part and being insertable into the opening, wherein
the opening has an upper edge and a lower edge;
the bridge portion has two legs and a center section connecting the two legs, along which center section a slot is present between the center section and the supporting part, and
the bridge portion has a detent that is located in a region of a forwardmost end of the center section, the detent having a slanted surface on its top side, which slanted surface, during the insertion of the bridge portion into the opening, deflects the region of the forwardmost end of the center section of the bridge portion in a direction of the lower edge of the opening.

16. The clip securing device according to claim 15, wherein the detent has a rounded cross-section.

17. The clip securing device according to claim 16, wherein the supporting part, the bridge portion and the detent are constructed in one piece of plastic material.

18. The clip securing device according to claim 17, wherein transitions between the two legs and the supporting part have a rounded design.

19. The clip securing device according to claim 18, wherein the plastic material is a thermoplast or a thermoplastic elastomer.

20. The motor vehicle according to claim 15, wherein the receiving part is provided on a structural part of the motor vehicle, and the insert part is provided on an assembly part of the motor vehicle.

\* \* \* \* \*